United States Patent
Aggoune et al.

(10) Patent No.: US 12,208,815 B2
(45) Date of Patent: *Jan. 28, 2025

(54) INTELLIGENT DRIVING PASSIVE PEDAL CONTROL

(71) Applicant: DELPHI TECHNOLOGIES IP LIMITED, St. Michael (BB)

(72) Inventors: Karim Aggoune, Auburn Hills, MI (US); Frans M. Theunissen, Rochester Hills, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,829

(22) Filed: Aug. 3, 2023

(65) Prior Publication Data

US 2023/0382410 A1   Nov. 30, 2023

Related U.S. Application Data

(63) Continuation of application No. 17/035,904, filed on Sep. 29, 2020, now Pat. No. 11,780,453.

(51) Int. Cl.
*B60W 50/08* (2020.01)
*B60W 10/04* (2006.01)
*B60W 10/10* (2012.01)
*B60W 50/10* (2012.01)

(52) U.S. Cl.
CPC .......... *B60W 50/087* (2013.01); *B60W 10/04* (2013.01); *B60W 10/10* (2013.01); *B60W 50/10* (2013.01); *B60W 2510/0604* (2013.01); *B60W 2520/30* (2013.01); *B60W 2556/50* (2020.02); *B60W 2710/105* (2013.01)

(58) Field of Classification Search
None
See application file for complete search history.

(56) References Cited

U.S. PATENT DOCUMENTS

| 8,050,856 | B2 * | 11/2011 | Duty ..................... | B60W 10/10 |
| | | | | 701/99 |
| 8,849,488 | B2 * | 9/2014 | Kleine-Besten ...... | B60W 20/10 |
| | | | | 701/400 |
| 9,557,746 | B2 * | 1/2017 | Nefedov ............. | B60L 15/2045 |

(Continued)

FOREIGN PATENT DOCUMENTS

| CN | 109070870 A | 12/2018 |
| CN | 109070896 A | 12/2018 |

(Continued)

*Primary Examiner* — Jonathan M Dager
(74) *Attorney, Agent, or Firm* — Dickinson Wright PLLC

(57) ABSTRACT

A method for assignment of vehicle control includes receiving route data indicating a route between a starting location of a vehicle and a destination location, and determining an optimal vehicle configuration for the route based on a target vehicle speed and a hybrid torque split. The method further includes receiving a driver requested torque value and determining a passive pedal torque value based on the route data and vehicle powertrain data. The method further includes selectively assigning control of the vehicle to a vehicle system or to a driver of the vehicle based on the driver requested torque value and the passive pedal torque value.

17 Claims, 6 Drawing Sheets

(56) References Cited

U.S. PATENT DOCUMENTS

| | | | |
|---|---|---|---|
| 9,849,870 B2* | 12/2017 | Morisaki | B60L 3/12 |
| 10,649,452 B2* | 5/2020 | Ichikawa | B60W 60/0059 |
| 10,654,482 B2* | 5/2020 | Urano | G05D 1/0061 |
| 10,759,445 B2* | 9/2020 | Matsumoto | B60W 50/12 |
| 10,895,875 B2* | 1/2021 | Hashimoto | G05D 1/0061 |
| 11,370,448 B2* | 6/2022 | Tsuji | B60W 40/08 |
| 11,458,982 B2* | 10/2022 | Chiba | G08G 1/16 |
| 11,628,881 B2* | 4/2023 | Igarashi | G05D 1/0088 701/23 |
| 2010/0299056 A1* | 11/2010 | Mueller | G01C 21/3469 701/532 |
| 2011/0035124 A1* | 2/2011 | Gentile | F16H 61/16 701/58 |
| 2011/0238457 A1* | 9/2011 | Mason | G06Q 10/063112 705/7.14 |
| 2012/0101698 A1* | 4/2012 | Eriksson | B60W 30/143 701/53 |
| 2014/0222272 A1* | 8/2014 | Raste | B60K 31/0008 701/22 |
| 2014/0277835 A1* | 9/2014 | Filev | G01C 21/3469 701/2 |
| 2016/0167642 A1* | 6/2016 | Debert | B60W 20/12 180/65.265 |
| 2016/0207538 A1* | 7/2016 | Urano | G05D 1/0278 |
| 2017/0010612 A1* | 1/2017 | Asakura | G01C 21/3415 |
| 2017/0036543 A1* | 2/2017 | Tschanz | B60W 50/0097 |
| 2017/0259819 A1* | 9/2017 | Takeda | B60W 30/18163 |
| 2017/0270799 A1* | 9/2017 | Takeda | B62D 15/02 |
| 2017/0351256 A1* | 12/2017 | Kumakiri | B60W 60/0053 |
| 2018/0017969 A1* | 1/2018 | Nagy | B60W 50/14 |
| 2018/0058868 A1* | 3/2018 | Kang | B60W 20/12 |
| 2018/0105158 A1* | 4/2018 | Namuduri | B60W 40/076 |
| 2018/0173228 A1* | 6/2018 | Wada | B60W 30/182 |
| 2018/0201250 A1* | 7/2018 | D'Amato | B60W 20/13 |
| 2019/0054928 A1* | 2/2019 | Hatano | B60W 50/14 |
| 2019/0283769 A1* | 9/2019 | Chiba | B60W 60/0054 |
| 2019/0291747 A1* | 9/2019 | Chiba | G08G 1/00 |
| 2019/0300014 A1* | 10/2019 | Nagase | B60K 35/29 |
| 2020/0062126 A1* | 2/2020 | Duan | B60L 58/25 |
| 2020/0124431 A1* | 4/2020 | Heap | G05D 1/0217 |
| 2020/0216058 A1* | 7/2020 | Aggoune | B60W 60/0023 |
| 2020/0247414 A1* | 8/2020 | Ishioka | B60W 50/14 |
| 2020/0269839 A1* | 8/2020 | Sato | B60W 30/18163 |
| 2020/0391721 A1* | 12/2020 | Wang | B60W 10/06 |
| 2021/0046946 A1* | 2/2021 | Nemec | G05D 1/0061 |
| 2021/0163026 A1* | 6/2021 | Ochida | B60W 60/0015 |
| 2021/0213932 A1* | 7/2021 | Aggoune | B60W 50/0097 |
| 2022/0227382 A1* | 7/2022 | Kuehner | B60W 50/0097 |
| 2023/0160707 A1* | 5/2023 | Kibalama | B60L 50/61 701/22 |
| 2023/0242111 A1* | 8/2023 | Aggoune | B60W 30/143 701/22 |
| 2024/0085204 A1* | 3/2024 | Diab | G01C 21/3461 |

FOREIGN PATENT DOCUMENTS

| | | |
|---|---|---|
| CN | 109484408 A | 3/2019 |
| CN | 110871781 A | 3/2020 |
| CN | 110997457 A | 4/2020 |
| CN | 111267638 A | 6/2020 |
| CN | 111674456 A | 9/2020 |

* cited by examiner

INTELLIGENT DRIVING PASSIVE PEDAL CONTROL

CROSS-REFERENCE TO RELATED APPLICATION

This U.S. Continuation application claims priority to U.S. Utility application Ser. No. 17/035,904, filed Sep. 29, 2020, which is incorporated herein by reference in its entirety.

STATEMENT REGARDING FEDERALLY SPONSORED RESEARCH OR DEVELOPMENT

This invention was made with government support under the DE-EE0006839 contract, awarded by the U.S. Department of Energy, Advanced Research Projects Agency (ARPA-E). The U.S. Government has certain rights in the invention.

TECHNICAL FIELD

This disclosure relates to vehicle route optimization, and in particular to systems and methods for optimizing when a vehicle along a route is to be controlled by a driver and when the vehicle is to be controlled by one or more systems of the vehicle.

BACKGROUND

Vehicles, such as cars, trucks, sport utility vehicles, crossovers, mini-vans, commercial vehicles, military vehicles, or other suitable vehicles, include a powertrain system that includes, for example, a propulsion unit, a transmission, drive shafts, wheels, and other suitable components. The propulsion unit may include an internal combustion engine, a fuel cell, one or more electric motors, and the like. A hybrid vehicle may include a powertrain system comprising more than one propulsion unit. For example, a hybrid vehicle may include an internal combustion engine and an electric motor that cooperatively operate to propel the vehicle. The vehicle may also include a Plug-in Hybrid Electric Vehicle (PHEV) or a Battery Electric Vehicle (BEV).

An operator of the vehicle may interact with a computing device, such as personal computing device, a mobile computing device, or a computing device integrated into the vehicle, to select a route between the vehicle's current location (e.g., or other starting or initial location) and a desired destination location. For example, the operator may provide information (e.g., an address, global positioning coordinates, and the like) to the computing device indicating a starting (e.g., or initial location or origin) and the desired destination. Additionally, or alternatively, the current location of the vehicle may be determined by the computing device and the desired destination may be suggested or provided by the computing device (e.g., based on travel history, time of day, etc.) or the operator may provide the desired destination. The computing device may identify routes between a starting location or the vehicle's current location (e.g., determined using a global position system or other suitable system) and the desired destination and present the identified routes to the operator. Typically, an identified route is presented with additional information, such a total distance of the identified route or a total time to traverse the identified route.

SUMMARY

This disclosure relates generally to vehicle route selection systems and methods.

An aspect of the disclosed embodiments is a method for assignment of vehicle control. The method includes receiving route data indicating a route between a starting location of a vehicle and a destination location, and determining a vehicle travel configuration for the route based on the route data. The method further includes receiving a driver requested torque value and determining a passive pedal torque value based on the route data and vehicle powertrain data. The method further includes selectively assigning control of the vehicle to a vehicle system or to a driver of the vehicle based on the driver requested torque value and the passive pedal torque value.

Another aspect of the disclosed embodiments is an apparatus for assignment of vehicle control that includes a processor and a memory. The memory includes instructions that, when executed by the processor, cause the processor to receive route data indicating a route between a starting location of the vehicle and a destination location. The instructions further cause the processor to determine a vehicle travel configuration for the route based on the route data. The instructions further cause the processor to receive a driver requested torque value and determine a passive pedal torque value based on vehicle powertrain data. The instructions further cause the processor to selectively assign control of the vehicle to a vehicle system or to a driver of the vehicle based on the driver requested torque value and the passive pedal torque value.

Another aspect of the disclosed embodiments is a non-transitory computer-readable storage medium, comprising instructions that, when executed by a processor, cause the processor to receive route data indicating a route between a starting location of the vehicle and a destination location. The instructions, when executed by the processor, further cause the processor to determine a vehicle travel configuration for the route based on the route data. The instructions, when executed by the processor, further cause the processor to receive a driver requested torque value. The instructions, when executed by the processor, further cause the processor to determine a passive pedal torque value based on the route data and vehicle powertrain data. The instructions, when executed by the processor, further cause the processor to selectively assign control of the vehicle to a vehicle system or to a driver of the vehicle based on the driver requested torque value and the passive pedal torque value.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
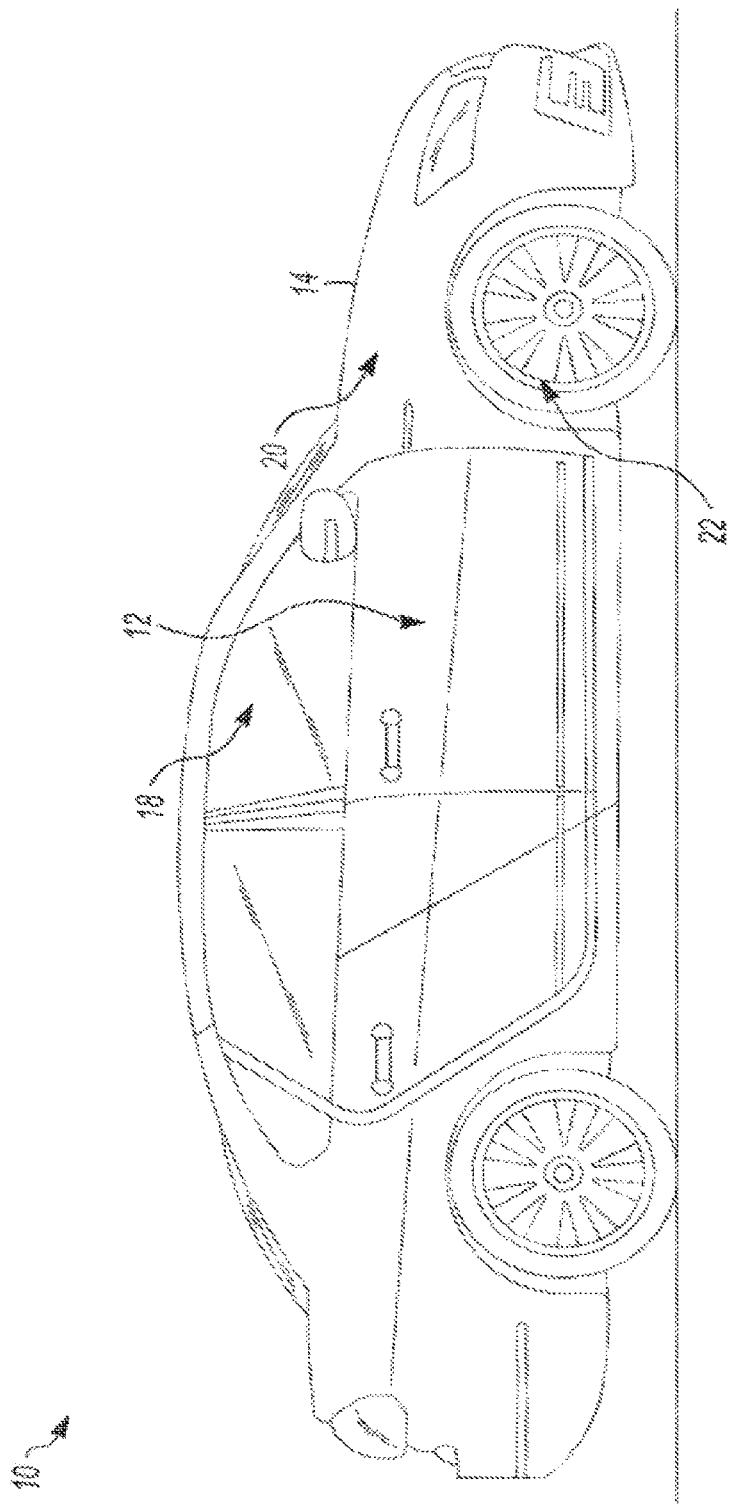
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Vehicles, such as cars, trucks, sport utility vehicles, crossovers, mini-vans, commercial vehicles, military vehicles, or other suitable vehicles, include a power train system that includes, for example, a propulsion unit, a transmission, drive shafts, wheels, and other suitable components. The propulsion unit may include an internal combustion engine, a fuel cell, one or more electric motors, and the like. A hybrid vehicle may include a powertrain system comprising more than one propulsion unit. For example, a hybrid vehicle may include an internal combustion engine, a battery, and an electric motor that cooperatively operate to propel the vehicle.

An operator of the vehicle may interact with a computing device, such as a mobile computing device, a personal computing device, or a computing device integrated into the vehicle, to select a route between the vehicle's current location (e.g., or a starting or initial location) and a desired destination location. For example, the operator may provide information (e.g., an address, global positioning coordinates, and the like) to the computing device indicating the desired destination. Alternatively, the computing device may suggest or provide a destination to the operator (e.g., based on travel history, time of day, etc.). The computing device may identify routes between the vehicle's current location (e.g., determined using a global position system or other suitable system) or a starting location (e.g., provided by the operator) and the desired destination and present the identified routes to the operator. Typically, an identified route is presented with additional information, such a total distance of the identified route or a total time to traverse the identified route.

In some situations, a route may be traversed by an autonomous or partially autonomous vehicle. In these situations, the computing device (e.g., using a cruise control system) may identify an optimal route based on vehicle speed, acceleration, and hybrid torque split, such that the vehicle may traverse the route using a target vehicle speed, acceleration, braking, and hybrid torque split in an autonomous-like fashion.

However, autonomous driving may not always be desired. For example, the driver may wish to manually control the vehicle if the vehicle is affected by a traffic condition unaccounted for by the autonomous driving system, if the driver has to apply the brakes quickly to avoid an accident, if the driver has to stop and start frequently during a traffic jam, and/or the like. Accordingly, systems and methods, such as those described herein, configured to provide seamless transition of the control of the vehicle between the driver and a system of the vehicle (e.g., the autonomous driving system), may be desirable.

In some embodiments, the systems and methods described herein may be configured to selectively assign control of a vehicle to a vehicle system or to a driver of the vehicle. For example, the systems and methods may receive route data indicating a route between a starting location and a destination location of the vehicle. The systems and methods may determine an optimal configuration for the route based on the route data. The systems and methods may receive a driver requested torque value. The systems and methods may determine a passive pedal torque value based on the route data and/or vehicle powertrain data. The vehicle powertrain data may include at least one of: a driveshaft torque value, a transmission output torque value, a transmission input torque value, or a flywheel torque value. The systems and methods may compare the driver requested torque value with the passive pedal torque value and may selectively assign control of the vehicle based on whichever value is lower. For example, if the driver requested torque value is less than the passive pedal torque value, the systems and methods may assign control of the vehicle to the driver. If the passive pedal torque value is less than the driver requested torque value, the systems and methods may assign control of the vehicle to the vehicle system.

In this way, the controller selectively assigns control of the vehicle while the vehicle is traversing the route. This reduces a utilization of resources (e.g., fuel of the vehicle, processing resources of the controller, and/or the like) relative to a vehicle configuration that, in some situations, assigns too much control to a vehicle sub-system or too much control to the driver. Furthermore, by selectively assigning control of the vehicle in the manner described herein, the vehicle may be implemented without a cruise control mechanism. This reduces manufacturing, operating, and/or maintenance costs and creates a control assignment scheme that is light-weight and scalable. Moreover, selectively assigning control of the vehicle allows the driver to utilize the benefits of autonomous or partially autonomous driving while maintaining the safety of the driver and any passengers.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, any suitable military vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 may be disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel, clutch, or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22.

When the vehicle 10 includes one or more electric motors, a vehicle battery, and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control module or mechanism, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
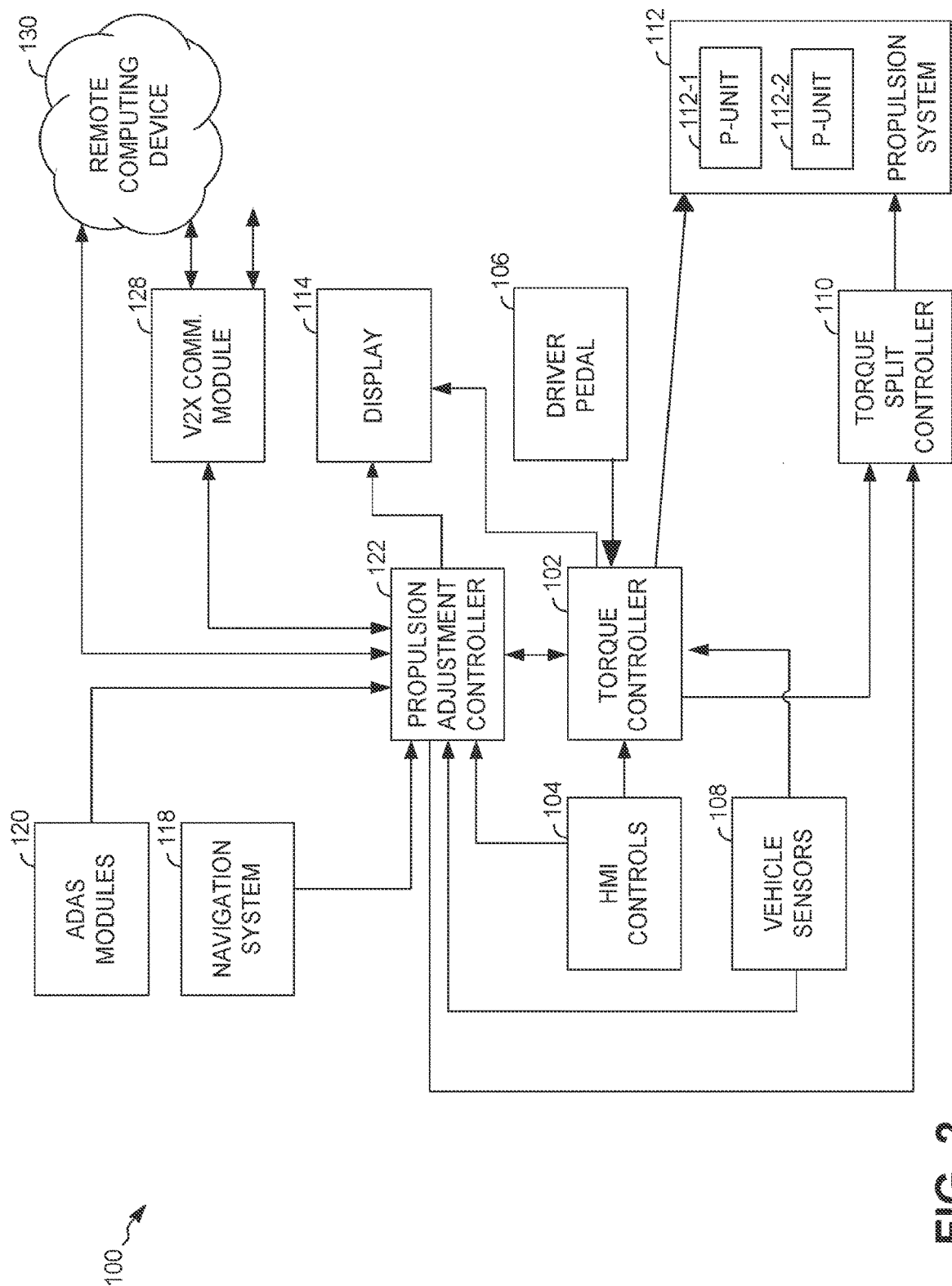
FIG. 2 generally illustrates a block diagram of a vehicle system according to the principles of the present disclosure.

FIG. 2 generally illustrates a block diagram of a system 100 according to the principles of the present disclosure. The system 100 may be disposed within a vehicle, such as the vehicle 10. The system 100 may be configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof).

In some embodiments, the profiles of the target vehicle speed and/or the target vehicle torque split correspond to a vehicle speed at which the vehicle 10 achieves an optimum energy consumption efficiency with respect to a portion of a route being traversed by the vehicle 10. In some embodiments, the profiles correspond to one or more other factors, such as a total time to reach a destination location, fuel optimization, overall driver safety, and/or the like.

In some embodiments, the system 100 may include a torque controller 102, human machine interface (HMI) controls 104, a driver pedal 106, vehicle sensors 108, torque controller 102, a torque split controller 110, a propulsion system 112, and a display 114. In some embodiment, the display 114 may include a portion of a dash or console of the vehicle 10, a navigation display of the vehicle 10, or other suitable displays of the vehicle 10. In some embodiments, the display 114 may be disposed on a computing device, such as a mobile computing device used by the operator.

In some embodiments, the system 100 may include a propulsion adjustment controller (PAC) 122, a navigation system 118 (e.g., which may include one or more global position system (GPS) components) in communication with a mapping characteristics module (not shown), advanced driver assistance system (ADAS) modules 122, and a vehicle to other systems (V2X) communication module 128. The V2X communication module 128 may be configured to communication with other vehicles, other infrastructure (e.g., such as traffic infrastructure, mobile computing devices, and/or other suitable infrastructure), a remote computing device (e.g., the remote computing device 130), other suitable systems, or a combination thereof.

As will be described, the system 100 may be in communication with one or more remote computing devices 130. In some embodiments, at least some of the components of the system 100 may be disposed in a propulsion control module (PCM) or other onboard vehicle-computing device. For example, the PAC 122 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 122 may be disposed on a memory and executed by a processor. It should be understood that the system 100 may include any combination of computing devices, either disposed locally in the vehicle 10 and/or disposed remotely, including mobile computing devices, as will be described.

One or more embodiments, such as embodiments described below, refer to features or functionality of the torque controller 102. It is to be understood that these are provided by way of example, and that in practice, any other component of the system, or combination of components of the system, may implement the described features or functionality. In some embodiments, the torque controller 102 may be in communication with the HMI controls 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device.

In some embodiments, the operator of the vehicle 10 may interface with the HMI controls 104 to use the torque controller 102 to control vehicle propulsion and/or other features of the torque controller 102. For example, the operator may actuate an HMI switch of the HMI controls 104 disposed on the steering wheel of the vehicle 10. The HMI controls 104 may communicate a signal to the torque controller 102. The signal may indicate a desired vehicle speed selected by the operator. The torque controller 102 generates a torque demand corresponding to the desired vehicle speed and is in communication with the propulsion system 112 and/or other vehicle propulsion systems of the vehicle 10. The torque controller 102 selectively controls the propulsion system 112 and/or the other vehicle propulsion systems using the torque demand to achieve the desired vehicle speed. The operator may increase or decrease the desired vehicle speed by actuating additional switches of the HMI controls 104. The torque controller 102 may adjust the torque demand to achieve the increase or decrease in the desired vehicle speed.

The torque controller 102 may continuously adjust the torque demand in order to maintain the desired vehicle speed. For example, the torque controller 102 may be in communication with the vehicle sensors 108. The vehicle sensors 108 may include cameras, speed sensors, proximity sensors, other suitable sensors as will be described, or a combination thereof. The torque controller 102 may receive a signal from the vehicle sensors 108 that indicates a current vehicle speed. The torque controller 102 may adjust the torque demand to adjust the vehicle speed when the signal indicates that the current vehicle speed is different from the desired vehicle speed. For example, the vehicle 10 may traverse an incline that causes the vehicle 10 to reduce current vehicle speed (e.g., because the torque demand applied by the torque controller 102 is insufficient to maintain vehicle speed while on the incline). The torque controller 102 may increase the torque demand in order adjust the current vehicle speed, thereby achieving the desired vehicle speed.

In some embodiments, such as when the torque controller 102 includes an adaptive cruise control mechanism, the torque controller 102 may adjust the torque demand based on the proximity of a lead vehicle (e.g., a vehicle immediately in front of the vehicle 10). For example, the torque controller 102 may receive information from the vehicle sensors 108 indicating the presence of a lead vehicle. The information may be captured by the vehicle sensors 108 using cameras, proximity sensors, radar, the V2X communication module 128, other suitable sensors or input devices, or a combination thereof. The torque controller 102 may determine whether to maintain the desired vehicle speed or increase or decrease the torque demand in order to increase or decrease the current vehicle speed. For example, the operator may indicate, using the HMI controls 104, to maintain pace with the lead vehicle while keeping a safe stopping distance between the vehicle 10 and the lead vehicle. The torque controller 102 may selectively increase the torque demand if the lead vehicle is traveling faster than the vehicle 10 and may selectively decrease the torque demand if the lead vehicle is traveling slower relative to the vehicle 10.

The torque controller 102 may bring the vehicle 10 to a complete stop when the lead vehicle comes to a complete stop. For example, the torque controller 102 may be in communication with a brake controller to send a plurality of signals over a period indicating to the brake controller to control vehicle braking (e.g., the torque controller 102 may bring the vehicle to a stop over a period so as not to suddenly stop the vehicle, however, in the case of a sudden stop of the lead vehicle, the torque controller 102 brings the vehicle 10 to a sudden stop to avoid collision with the lead vehicle). The brake controller may be in communication with a brake system. The brake system may include a plurality of brake components that are actuated in response to the brake controller implementing braking procedures based on the plurality of signals from the torque controller 102.

In some embodiments, the torque controller 102 may implement engine braking and/or braking via one or more electric motors through a regenerative braking system by adjusting the torque demand to allow the vehicle 10 to come to a stop without use of the brake system or the torque controller 102 may use a combination of regenerative braking and the brake system to bring the vehicle 10 to a complete stop. In order to resume vehicle propulsion control, the operator indicates to resume vehicle propulsion control using the HMI controls 104 (e.g., the torque controller 102 is not configured to resume vehicle propulsion control without interaction from the operator). In some embodiments, the vehicle 10 may include a higher level of automation including a higher level of propulsion control, as described, and may include suitable controls for bringing the vehicle 10 to a complete stop without interaction with the operator of the vehicle 10.

In some embodiments, the torque controller 102 may provide the torque demand to the torque split controller 110. The torque split controller 110 may determine a torque split in order to utilize a first propulsion unit 112-1 and a second propulsion unit 112-2. In some embodiments, the first propulsion unit 112-1 may include an electric motor and the second propulsion unit 112-2 may include an internal combustion engine. It should be understood that while only an internal combustion engine and an electric motor are described, the vehicle 10 may include any hybrid combination of any suitable vehicle engines and motors. The torque split indicates a portion of the torque demand to be applied to the first propulsion unit 112-1 and a portion of the torque demand to be applied to the second propulsion unit 112-2. For example, the electric motor may be used alone for vehicle propulsion when the torque demand is below a threshold. However, the internal combustion engine may provide at least a portion of vehicle propulsion in order to assist the electric motor. The torque split controller 110 is in communication with the propulsion system 112, and accordingly, with the first propulsion unit 112-1 and the second propulsion unit 112-2, to apply the torque split.

In some embodiments, the torque controller 102 includes a plurality of safety controls. For example, the torque controller 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the torque controller 102 to perform one or more safety operations. For example, in the case of a lead vehicle coming to a sudden stop, the safety controls may generate a safety signal, based on proximity information from the vehicle sensors 108, indicating to the torque controller 102 to immediately bring the vehicle 10 to a complete stop. In some embodiments, the torque controller 102 may determine whether to apply the desired vehicle speed set by the operator using the HMI controls 104 based on the signal from the safety controls. For example, the operator may increase the desired vehicle speed, which may bring the vehicle 10 closer to the lead vehicle (e.g., the vehicle 10 would travel faster than the lead vehicle if the desired vehicle speed were achieved). The torque controller 102 may determine not to apply the desired vehicle speed, and instead may provide an indication to the display 114 indicating to the operator that increasing the desired vehicle speed may be unsafe or the torque controller 102 may ignore the increase in the desired vehicle speed. In some embodiments, the torque controller 102 may be in communication with a transmission controller module (TCM). The torque controller 102 may receive information from the TCM (e.g., an automatically selected gear) and may determine and/or adjust the total torque demand based on the information received from the TCM.

In some embodiments, the system 100 may include a vehicle propulsion controller (VPC). In some embodiments, the VPC may include an automatic vehicle propulsion system. For example, the VPC may include a cruise control mechanism, an adaptive cruise control mechanism, an automatic braking system, other suitable automatic vehicle propulsion system, or a combination thereof. Additionally, or alternatively, the VPC may include or be a portion of an autonomous vehicle system that controls all or a portion of vehicle propulsion, steering, braking, safety, route management, other autonomous features, or a combination thereof. In some embodiments, the VPC may perform one or more operations or functions described as being performed by the torque controller 102.

In some embodiments, the system 100 includes a personal computing device. The personal computing device may include any suitable computing device, such as a mobile computing device (e.g., smart phone, tablet, laptop, and the like), or any other suitable computing device. The personal computing device may include at least one processor and at least one memory. The at least one processor may include any suitable processor, such as those described herein. The at least one memory comprise any suitable memory or storage device and may include instructions that, when executed by the at least one processor, cause the processor to perform various functions, such as those described herein.

The personal computing device may be configured to receive various input information, such as vehicle input information, vehicle starting location, vehicle desired destination, route characteristic information, energy cost information, operator labor cost information, other suitable input information, or any combination thereof. The personal computing device is configured to determine a plurality of routes corresponding to the starting location and the desired destination location and provide the plurality of routes as selectable options to the operator of the vehicle 10. The plurality of routes may include additional information, such as a total route distance, a total route driving time, a total route energy cost, a total route labor cost, other suitable information, or a combination thereof, as will be described. While personal computing device is described as being configured to generate the plurality of routes and provide the plurality of routes to the operator of the vehicle, the PAC 122 may be configured to generate the plurality of routes and provide the plurality of routes to the operator, the personal computing device may cooperatively operate with the PAC 122 to receive the various input information and to generate the plurality of routes, or any other suitable computing device, vehicle component, or any combination thereof may receive the various inputs and provide the plurality of routes to the operator.

In some embodiments, the personal computing device may receive route characteristics information (e.g., describing road grade characteristics, route distance, route directions, etc.), vehicle parameter information, traffic characteristics information, weather characteristics information, vehicle-to-vehicle parameter information, other information or characteristics, or a combination thereof. The personal computing device may receive at least some of the route characteristics from a mapping characteristics module based on location information from the navigation system 118. The mapping characteristics module may be disposed within the vehicle 10 (e.g., within the system 100) or may be disposed on a remote computing device, such as the remote computing device 130.

In some embodiments, the mapping characteristics module or other suitable module may be disposed on the personal computing device. The navigation system 118 may be disposed within the vehicle 10 or within the personal computing device and may capture various global positioning signals from various global positioning satellites or other mechanisms. The navigation system 118 may communicate the captured signals to the mapping characteristics module. The mapping characteristics module may generate the route characteristics based on the signals received from the navigation system 118 or based on route characteristic information provided by the operator. For example, the personal computing device may receive route characteristics corresponding to the starting location (e.g., or current location) of the vehicle 10 and a desired destination location of the vehicle 10.

The route characteristics may include a route distance, route directions, road grade information of the route, other route characteristics, or a combination thereof. The personal computing device may receive the route characteristics from the remote computing device 130. In some embodiments, the PAC 122 may receive traffic signal location information, traffic stop sign location information, posted speed limit information, lane shift information, other route characteristics or information, or a combination thereof, from the mapping characteristics module based on location information from the navigation system 118. The PAC 122 may communicate the information to the personal computing device.

The personal computing device may receive at least some of the route characteristics information from the ADAS modules 120. The ADAS modules 120 may assist the operator of the vehicle 10 to improve safety. The ADAS modules 120 may be configured to automate and/or adapt and enhance vehicle systems for safety and better driving. The ADAS modules 120 may be configured to alert the operator of the vehicle 10 of upcoming traffic conditions or disabled vehicles and/or to alert the vehicle 10 of a vehicle proximate to the vehicle 10 in order to avoid collisions and accidents. Further, the ADAS modules 120 may autonomously avoid collisions by implementing safeguards and taking over control of the vehicle 10, such as, by automatic lighting, initiating adaptive cruise control (e.g., via the torque controller 102) and collision avoidance (e.g., by controlling a trajectory of the vehicle 10 or bringing the vehicle 10 to a complete stop either using the torque controller 102 or directly using the brake controller). The PAC 122 may receive information, such as traffic characteristics, vehicle proximity information, disabled vehicle information, other suitable information, or a combination thereof, from the ADAS modules 120 and communicate the received route characteristics to the personal computing device. In some embodiments, the personal computing device may omit receiving route characteristics from the ADAS modules 120.

The personal computing device may receive, at least, some of the route characteristics information from the V2X communication module 128. The V2X communication module 1280 is configured to communicate with other systems proximate or remotely located from the vehicle 10, as described, to obtain, and share information, such as, traffic information, vehicle speed information, construction information, other information, or a combination thereof. The PAC 122 may receive other vehicle speed information, other vehicle location information, other traffic information, construction information, other suitable information, or a combination thereof, from the V2X communication module 128 and may communicate the information to personal computing device. In some embodiments, the personal computing device may omit receiving the route characteristics from the V2X communication module 128.

The personal computing device may receive further vehicle parameter information from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 122 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108 and may communicate the received information to the personal computing device.

In some embodiments, the vehicle sensors 108 may include weather sensors, such as, a precipitation sensor or moisture sensor, a barometric pressure sensor, an ambient temperature sensor, other suitable sensors, or a combination thereof. The PAC 122 may receive current weather information, such as precipitation information, barometric pressure information, ambient temperature information, other suitable weather information, or a combination thereof, from the vehicle sensors 108 and may communicate the received information to the personal computing device. In some embodiments, the personal computing device may omit receiving information from the vehicle sensors 108.

The personal computing device may receive, at least, some of the route characteristics information from the remote computing device 130. For example, the personal computing device may receive information regarding route distance, route directions, road grade information of the route, traffic information, construction information, other vehicle location information, other vehicle speed information, vehicle maintenance information of the vehicle 10, other route characteristics, or a combination thereof, from the remote computing device 130. Additionally, or alternatively, the personal computing device may receive vehicle parameters from the remote computing device 130, such as, a make of the vehicle 10, model of the vehicle 10, propulsion configuration of the vehicle 10, manufacturer provided energy consumption efficiency of the vehicle 10, a weight of the vehicle 10, other vehicle parameters, or a combination thereof.

In some embodiments, the personal computing device may receive traffic signal location information, traffic stop sign location information, posted speed limit information, lane shift information, other route characteristics or information, or a combination thereof, from the remote computing device 130. The remote computing device 130 may include any suitable computing device or devices, such as a cloud computing device or system, a remotely located server or servers, a remotely or proximately located mobile computing device or application server that provides information to the personal computing device. The remote computing device 130 is remotely located from the vehicle 10, such as in a datacenter or other suitable location.

In some embodiments, the personal computing device may receive energy cost information from the remote computing device 130. For example, the personal computing device may communicate with the remote computing device 130 to obtain or receive a current per gallon price of fuel and/or a price per unit of electricity (e.g., average price in an area proximate the vehicle 10, such as near a location of the vehicle 10 or near a home location of the vehicle 10). In some embodiments, the operator may provide the current per gallon price of fuel and/or the price per unit of electricity (e.g., a price of fuel and/or electricity most recently paid by the operator or a typical per gallon price and/or the price per unit of electricity in the area proximate the operator's area of travel) to the personal computing device.

The personal computing device may receive route characteristics, vehicle parameters, and/or energy cost information from an operator of the vehicle 10. For example, the operator may interact with an interface of the personal computing device, such as using the a display of the personal computing device or using the display 114 of the vehicle, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the operator may provide route characteristics, such as a route map, route distance, other route characteristics, or a combination thereof, to the personal computing device.

In some embodiments, the personal computing device learns behavior of the operator of the vehicle 10. For example, the personal computing device monitors the operator's vehicle speed relative to posted speed limits. In some embodiments, the operator may provide a labor cost associated with the operator. For example, the operator may provide the operator's hourly wage or salary. Additionally, or alternatively, the operator may provide a personal value of time or other suitable representation of per unit time cost. As will be described, the personal computing device may determine a time cost for a route of the vehicle 10 using the operator's labor cost.

In some embodiments, the personal computing device may learn (e.g., identify, process using machine learning, etc.) traffic patterns for known routes traversed by the vehicle 10. For example, the PAC 122 may track traffic conditions while the vehicle 10 traverses one or more routes on a routine or regular basis. The personal computing device may determine traffic patterns for the routes based on the monitored traffic conditions. In some embodiments, the personal computing device receives traffic patterns for a route the vehicle 10 is traversing from the remote computing device 130, or from the mapping characteristics module based on the signals from the navigation system 118, as described.

It should be understood that the personal computing device may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the personal computing device may be configured to learn any suitable characteristics or information described or not described herein.

Typically, vehicles, such as the vehicle 10, include an infotainment system, such as a vehicle infotainment system (e.g., integrated into the vehicle dash, an application on a mobile computing device, or a combination thereof). The infotainment system may be configured to provide infotainment services, such as navigation services, entertainment services (e.g., movie or music playback, access to the Internet, and so on), or other suitable infotainment servicers.

The infotainment system may be configured to display the infotainment services to the display 114 or other suitable display within the vehicle 10.

In some embodiments, the infotainment system may be configured to provide the operator of the vehicle 10 with the ability to select between route alternatives for a desired destination location (e.g., a destination the operator of the vehicle 10 provides to the infotainment system or the personal computing device as an input). Such route alternatives are typically displayed with a travel time and/or a travel distance, such that, the operator of the vehicle 10 may select a route based on how long it will take to traverse the route, the total traversable distance of the route, or a combination of both. Additionally, or alternatively, the operator of the vehicle 10 may be able to provide preference information, such that the personal computing device may provide route alternatives based on the preferences (e.g., to avoid toll roads, use highways where available, and the like). In some embodiments, the personal computing device may communicate with the infotainment system and may provide the route alternatives to the operator using the infotainment system, the display of the personal computing device, or a combination thereof.

The personal computing device may receive a destination input from the operator of the vehicle 10. As described, the operator of the vehicle 10 may access an application on personal computing device to provide various input information and/or may receive the various inputs from the various components of the vehicle 10 described herein. For example, the operator may provide a starting location and a destination location to the application on the personal computing device. The personal computing device may communicate with components of the vehicle 10 described herein to receive vehicle information, route information, other suitable information, or a combination thereof. In some embodiments, the personal computing device may receive the input information and communicate with the remote computing device 130 to receive the various vehicle information, route information, other suitable information, or a combination thereof (e.g. the personal computing device may be disconnected from the various components of the vehicle 10).

The personal computing device, as described, communicates with the mapping characteristics module and may provide the destination input to the mapping characteristics module. The mapping characteristics module may return a plurality of routes between a current location of the vehicle 10 or a provided starting location of the vehicle 10 and the destination. The plurality of routes may include route characteristics, such as a travel time and a travel distance for each route of the plurality of routes. In some embodiments, the personal computing device may receive route information from the remote computing device 130, as described, and may generate the plurality of routes based on the route information.

The personal computing device may receive vehicle parameter information of the vehicle 10, as described. For example, the operator of the vehicle 10 may provide the vehicle parameter information during a setup or installation of the application on the personal computing device. The personal computing device may receive route characteristics information (e.g., including road grades, traffic, speed limits, stop signs, traffic signals, other route characteristics, or a combination thereof), as described, for each of the plurality of routes. The personal computing device may be configured to generate an energy consumption profile for the vehicle 10, as described. For example, the energy consumption profile may be generated using the information described above and may indicate an optimum energy consumption of the vehicle 10 for various route characteristics, such as road grades, traffic, speed limits, stop signs, traffic signals, other route characteristics, or a combination thereof.

The personal computing device may use the energy consumption profile for the vehicle 10 to generate an energy consumption for each route of the plurality of routes. For example, the personal computing device may apply the energy consumption profile to the particular route characteristics for each route of the plurality of routes to generate an energy consumption for the respective routes.

The personal computing device may determine an energy cost for each route of the plurality of routes. For example, when the vehicle 10 uses fuel, such as gasoline, diesel, or other suitable fuel, to propel the vehicle 10, as described, the energy cost may include a fuel cost. The personal computing device may determine the fuel cost for a respective route of the plurality of routes, by determining a product of the energy consumption for the respective route and the current cost per unit of fuel. When the vehicle 10 includes an electric vehicle, the energy cost may include an electricity cost. The personal computing device may determine the electricity cost for a respective route of the plurality of routes, by determining a product of the energy consumption for the respective route and the current cost per unit of electricity. When the vehicle 10 includes a hybrid vehicle, the energy cost may include a fuel cost and an electricity cost. The personal computing device may determine, for a respective route of the plurality of routes, the fuel cost, and the electricity cost. The personal computing device may determine the energy cost for the respective route by determining a sum of the fuel cost and the electricity cost for the respective route.

In some embodiments, the personal computing device determines a time cost for each route of the plurality of routes. For example, the personal computing device determines the time cost for a respective route of the plurality of routes by determining a product between a travel time for the respective route and the operator's labor cost (e.g., provided by the operator of the vehicle 10). The time cost may represent an opportunity cost associated with traversing the respective route instead of earning the operator's hourly wage or salary.

In some embodiments, the personal computing device may determine a total cost for each route of the plurality of routes. For example, the personal computing device may determine a total cost for a respective route of the plurality of routes by determining a sum of the energy cost and the time cost for the respective route.

The personal computing device may output the plurality of routes, including a travel distance, a travel time, a generated energy consumption, an energy cost, a time cost, and/or a total cost for each route of the plurality of routes. The personal computing device may output the plurality of routes to a route selection interface. The route selection interface may be provided to the operator of the vehicle on the display of the personal computing device, on the infotainment system, or a combination thereof.

The operator of the vehicle 10 may select a route from the plurality of routes. The personal computing device may receive route information indicating the selected route. In some embodiments, the personal computing device may generate navigation output and communicate the navigation output to the infotainment system (e.g., or other suitable display device, as described), may provide the navigation output to the display of the personal computing device, or a combination thereof. The navigation output may include a portion of the selected route (e.g., a portion of the selected route immediately ahead of the vehicle 10) and instructions for traversing the selected route. The personal computing device may continue to adjust and/or update the navigation output as the vehicle 10 traverses the selected route (e.g., the personal computing device may change the portion of the selected route and the instructions for traversing the selected route as the vehicle 10 traverses the selected route).

In some embodiments, the operator of the vehicle 10 may follow the instructions output by the personal computing device in order to traverse the selected route with the vehicle 10. The personal computing device may monitor route characteristics of the selected route as the vehicle 10 traverses the selected route. The personal computing device may provide feedback to the operator of the vehicle 10 (e.g., using the infotainment system, the display of the personal computing device, or a combination thereof). The feedback may recommend an alternative route to the operator of the vehicle 10 if, for example, the route characteristics indicate that traffic has increased on the selected route, an accident occurred on the selected route, or other significant changes to route characteristics of the selected route occurred.

In some embodiments, the operator of the vehicle 10 may provide route selection preferences to the personal computing device. For example, the operator may indicate, a preference for routes having a lower total cost, a lower energy cost, a lower time cost, a lower energy consumption, a shorter travel time, a shorter distance, or any combination thereof. The personal computing device may output the plurality of routes according to the operator's preferences. Additionally, or alternatively, the personal computing device may automatically select a route of the plurality of routes based on the preferences of the operator.

Figure 3A:
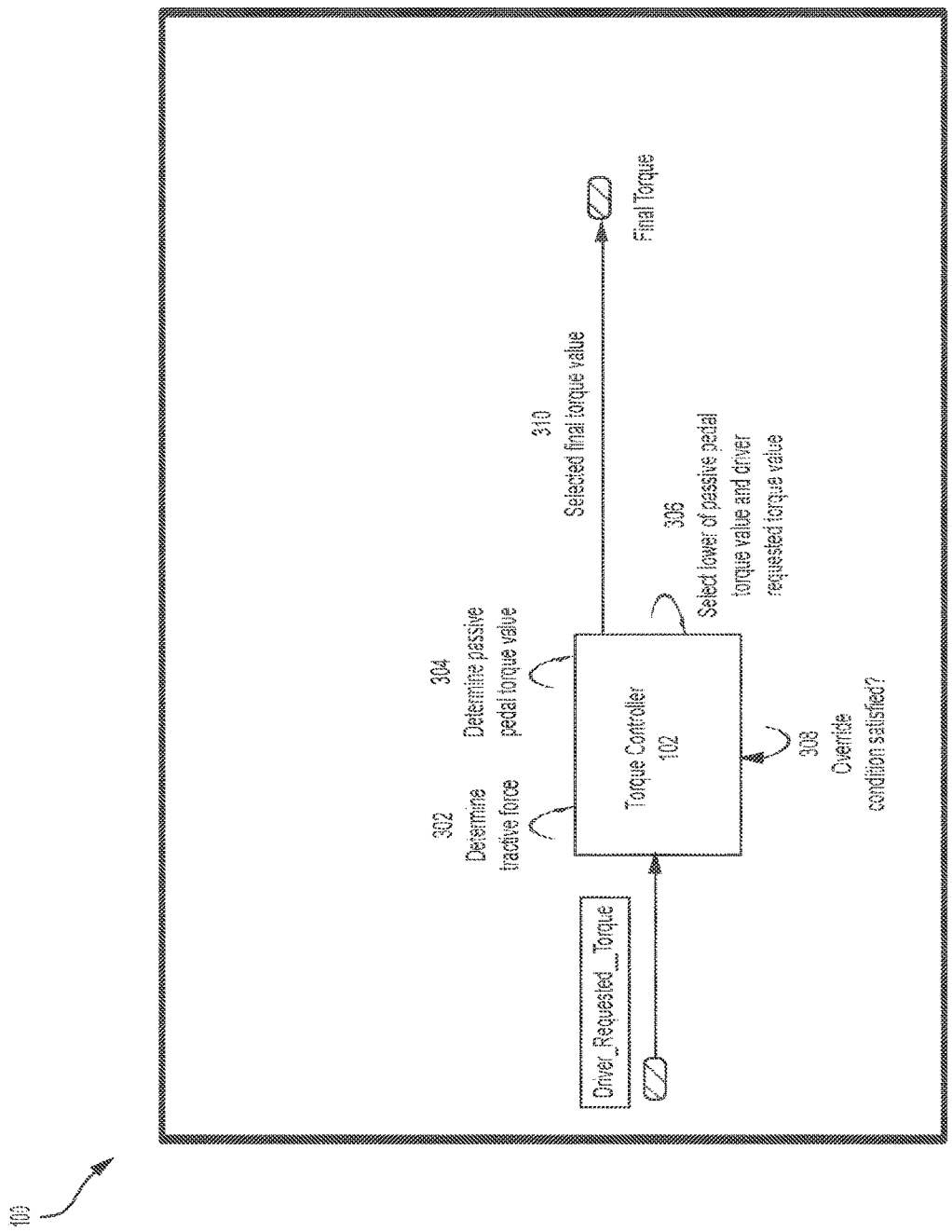
FIG. 3A generally illustrates a system for selectively assigning control of a vehicle to a driver or to a sub-system of the vehicle, according to the principles of the present disclosure.

FIG. 3A generally illustrates a system (e.g., the system 100) for selectively assigning control of a vehicle 10 to a driver or to a sub-system of the vehicle 10, according to the principles of the present disclosure. For example, the system 100 (e.g., using the torque controller 102 and/or another type of controller) may selectively assign control of the vehicle 10 to a driver or to a sub-system of the vehicle 10. The sub-system may include an autonomous driving system, a partially autonomous driving system, and/or another sub-system of the vehicle 10. In some embodiments, the torque controller 102 may selectively assign control of the vehicle 10 while the vehicle 10 is traversing a route to a destination location.

In some embodiments, the vehicle 10 may include one or more components described in connection with FIG. 2. In some embodiments, the vehicle 10 may exclude a cruise control mechanism. Typically, a cruise control mechanism may include an intelligent driving module used to determine a target vehicle speed (e.g., while the vehicle is traversing a route). By selectively assigning control of the vehicle 10 using features described herein, the vehicle 10 does not need to rely on a cruise control mechanism for determining the target vehicle speed while traversing the route.

In some embodiments, the torque controller 102 (or another component of the system 100) may determine an optimal vehicle configuration (e.g., before selectively assigning control of the vehicle 10). For example, the torque controller 102 may receive route data indicating the route that vehicle 10 is to traverse, vehicle data indicating one or more vehicle characteristics (e.g., vehicle weight, shape, model, etc.) of the vehicle 10, traffic data indicating one or more traffic conditions, weather data indicating a weather forecast at a given time, and/or any other data capable of being used to determine an optimal vehicle configuration for the route. This may allow the torque controller 102 to process one or more of the respective data types to determine the optimal vehicle configuration. In some embodiments, the optimal vehicle configuration may include speed data indicating a target vehicle speed at which the vehicle 10 is to travel at one or more points of the route, gear configuration data indicating a gear that the vehicle 10 is recommended to be positioned in based on vehicle speed and/or other factors, diagnostic data indicating one or more diagnostic updates relating to the vehicle 10, and/or the like.

In some embodiments, the torque controller 102 may determine a final torque value to provide to the torque split controller 110. As will be described, if the final torque value that the torque controller 102 provides to the torque split controller 110 is a driver requested torque value, the driver will maintain control of the vehicle. If the final torque value that the torque controller 102 provides to the torque split controller 110 is a passive pedal torque value, the sub-system of the vehicle 10 will maintain control, such as an autonomous driving system, a partially autonomous driving system, or another type of driving system.

In some embodiments, as shown by reference number 302, the torque controller 102 may determine a tractive force of the vehicle 10. For example, to determine a final torque value to be applied to a motor and/or an engine as the vehicle 10 is in motion along the route, the torque controller 102 may first determine a tractive force of the vehicle 10. The tractive force represents a force between the vehicle 10 and a road or surface that the vehicle 10 is traversing along, and includes a force that allows the vehicle 10 to stay at or maintain the target vehicle speed along the route, a force to take the vehicle 10 from a current speed to the target vehicle speed, and/or a closed loop force that accounts for various real-time conditions. The tractive force of the vehicle 10 may be used to determine the passive pedal torque value.

In some embodiments, the torque controller 102 may be triggered to determine the tractive force of the vehicle 10 based on a condition being satisfied. For example, the torque controller 102 may be triggered to determine the tractive force based on receiving a signal indicative of the vehicle engine being turned on, receiving a signal indicative of the vehicle 10 being in motion, receiving a driver requested torque value, receiving a request (e.g., from an application accessible by a user, such as a global positioning system (GPS) application), and/or the like. The torque controller 102 may determine the tractive force based on sensor data and/or other related input data received from one or more data sources, as described in connection with FIG. 3B.

In some embodiments, the torque controller 102 may receive a driver requested torque value. For example, a force applied by a driver to a driver pedal 308 may cause a driver requested torque value to be generated and provided to the controller.

In some embodiments, the torque controller 102 may receive a passive pedal torque value. The passive pedal torque value represents a torque that can be applied (e.g., as the final torque value) to maintain target vehicle speed throughout the route, as will be further described in connection with FIG. 3C. In some embodiments, the torque controller 102 may determine the passive pedal torque value based on the tractive force.

In some embodiments, as shown by reference number 304, the torque controller 102 may select the passive pedal torque value or the driver requested torque value. For example, the torque controller 102 may compare the passive pedal torque value and the driver requested torque value and may select a lowest of the two values. If the driver requested torque value is less than the passive pedal torque value, the torque controller 102 may select the driver requested torque value to be used as the final torque value provided to the torque split controller 110 (e.g., which may be part of an engine control unit (ECU)). If the passive pedal torque value is less than the driver requested torque value, the torque controller 102 may select the passive pedal torque value as the final torque value.

In some embodiments, and as shown by reference number 306, the torque controller 102 may determine whether one or more override conditions are satisfied. For example, the torque controller 102 may be configured with one or more override conditions that allow the driver to maintain control of the vehicle 10 (e.g., even if the passive pedal torque value is less than the driver requested torque value). In this case, the torque controller 102 may receive the driver requested torque value and may be configured with a torque override value. In this case, the torque controller 102 may compare the driver requested torque value with the torque override value. If, for example, the driver requested torque value is greater than the configured torque override value, the torque controller 102 may select the driver requested torque value. If, for example, the torque override value is greater than the driver requested torque value, an override condition is satisfied and the torque controller 102 may select the driver requested torque value.

In some embodiments, as shown by reference number 308, the torque controller 102 may provide a selected final torque value (e.g., the driver requested torque value or the passive pedal torque value) to another component, device, or sub-system of the system 100. For example, the torque controller 102 may provide the selected final torque value to the torque split controller 110. In some embodiments, a switch associated with the system 100 may perform the check to determine whether the override condition is satisfied. In this case, the switch may select the final torque value and provide the final torque value to the torque split controller 110.

In this way, the torque controller 102 utilizes the tractive force and the passive pedal torque value to selectively assign control of the vehicle 10 while the vehicle 10 is traversing the route.

Figure 3B:
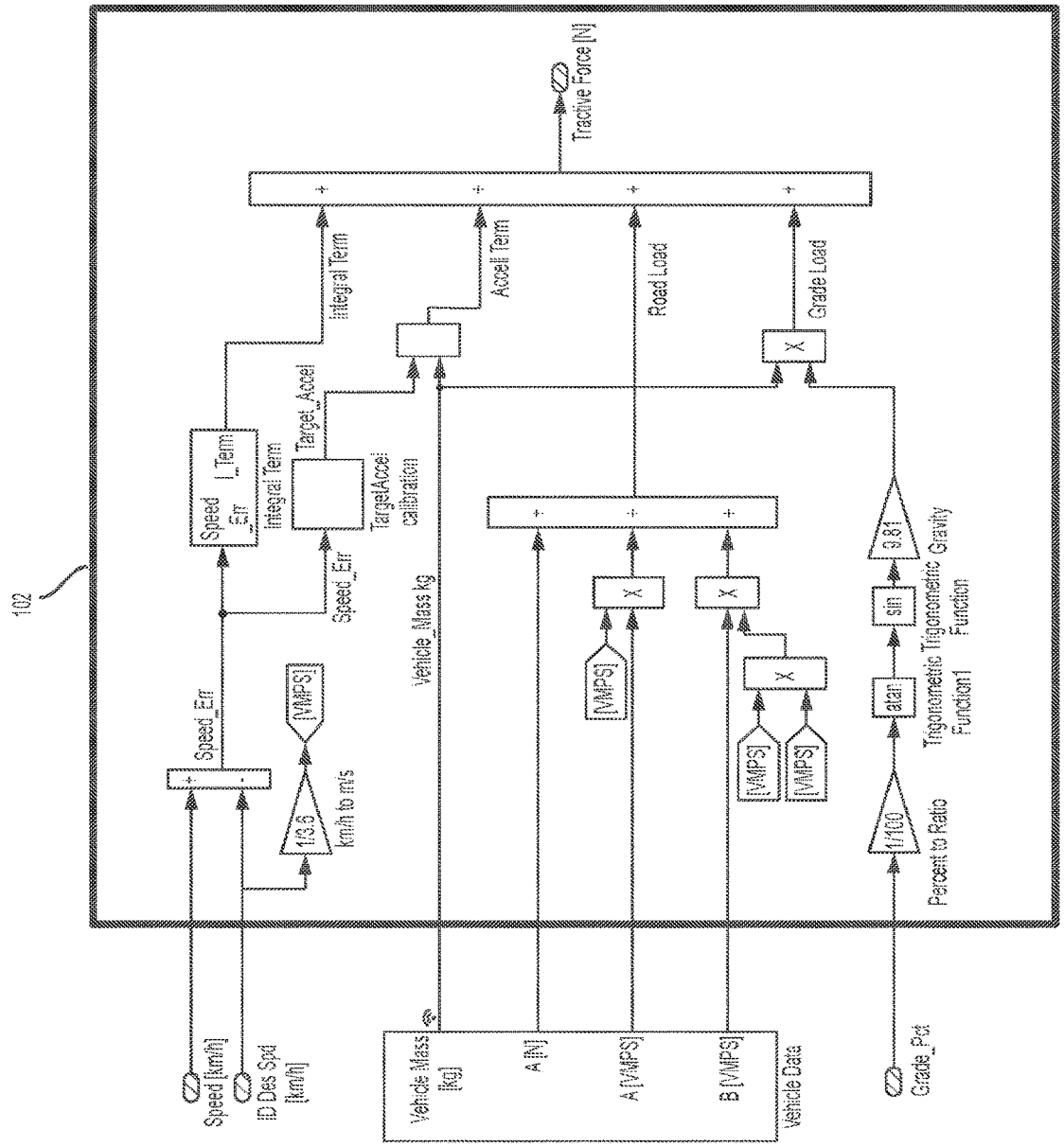
FIGS. 3B and 3C generally illustrate logic used by a controller of the system to selectively assigning control of the vehicle to the driver or to the sub-system of the vehicle, according to the principles of the present disclosure.

FIG. 3B illustrates the torque controller 102 determining the tractive force. As described, the tractive force may include a force that allows the vehicle 10 to stay at or maintain the target vehicle speed along the route, a force to take the vehicle 10 from a current speed to the target vehicle speed, and/or a closed loop force that accounts for various real-time conditions. In some embodiments, another controller may be configured to determine the tractive force. This may allow the other controller to be dedicated to processing heavier load requirements associated with the tractive force determination, thereby freeing up processing and memory resources of the torque controller 102 and improving efficiency of one or more embodiments described herein.

In some embodiments, the torque controller 102 may receive input data that may be used to determine the tractive force. As shown on the left hand side of FIG. 3B, the torque controller 102 may receive first speed data indicating a current vehicle speed of the vehicle 10, second speed data indicating the target vehicle speed, vehicle data indicating one or more characteristics of the vehicle, grade data indicating a grade of a road or surface that the vehicle 10 is traveling on, and/or the like. The vehicle data may include mass data indicating a mass of the vehicle, vehicle coast down curve parameters (shown as A [N], B [N/Mps], and C [N/Mps2]) that represent resistance at steady state on a flat road, and/or the like.

In some embodiments, the torque controller 102 may determine the force that allows the vehicle 10 to stay at or maintain the target vehicle speed along the route. For example, the torque controller 102 may determine the force that allows the vehicle 10 to maintain the target vehicle speed based on a road load force and a road grade force. This may be determined using a data model that, for example, can be generated using the vehicle coast down curve parameters and the following equation:

$$F = a + (b*\text{Speed}) + (c*\text{Speed}^2) + F_{rg} \quad \text{(Equation 1)}$$

In equation 1, variables a, b, and c, represent coefficients for zero, first, and second power of speed, respectively, in a dimensionless total resistance function for the vehicle 10. The force may be the sum of variable a, an output of variable b*vehicle speed, an output of variable c*the vehicle speed times, and $F_{rg}$, which represents a force that allows the vehicle 10 to ascend or descend a current road grade. $F_{rg}$ may be computed using the following equation:

$$F_{rg} = \sin(a \tan(\text{Grade}))*9.81*\text{VehicleMass} \quad \text{(Equation 2)}$$

In equation 2, the mass of the vehicle 10 may be multiplied against a gravitational constant and an output of a trigonometric function that takes the sin of the arc of the tangent of the grade data. This allows the torque controller 102 to determine the force that allows the vehicle 10 to stay at or maintain the vehicle speed along the route.

In some embodiments, the torque controller 102 may determine the force to take the vehicle 10 from a current speed to the target vehicle speed. For example, the torque controller 102 (e.g., using an addition or subtraction module) may determine a target acceleration force by determining a speed differential between a current vehicle speed and the target vehicle speed and by computing (e.g., using a target acceleration calibration module) the target acceleration force based on the speed differential. The torque controller 102 may then determine the force to take the vehicle 10 to the target vehicle speed using the following equation:

$$F = \text{DesiredAccel}*\text{VehicleMass} \quad \text{(Equation 3)}$$

In some embodiments, the torque controller 102 may determine the closed loop force that accounts for various real-time conditions. For example, the torque controller 102 may determine the closed loop force by adding an integral term to the tractive force to bring the vehicle to the target vehicle speed over time. The integral term may, for example, account for real-time road conditions, changes in weather, and/or the like. The integral term may be implemented using a closed-loop feedback technique.

In this way, the torque controller 102 determines the tractive force that will allow the controller to accurately determine whether to assign control of the vehicle 10 to the driver or to the sub-system of the vehicle 10.

Figure 3C:
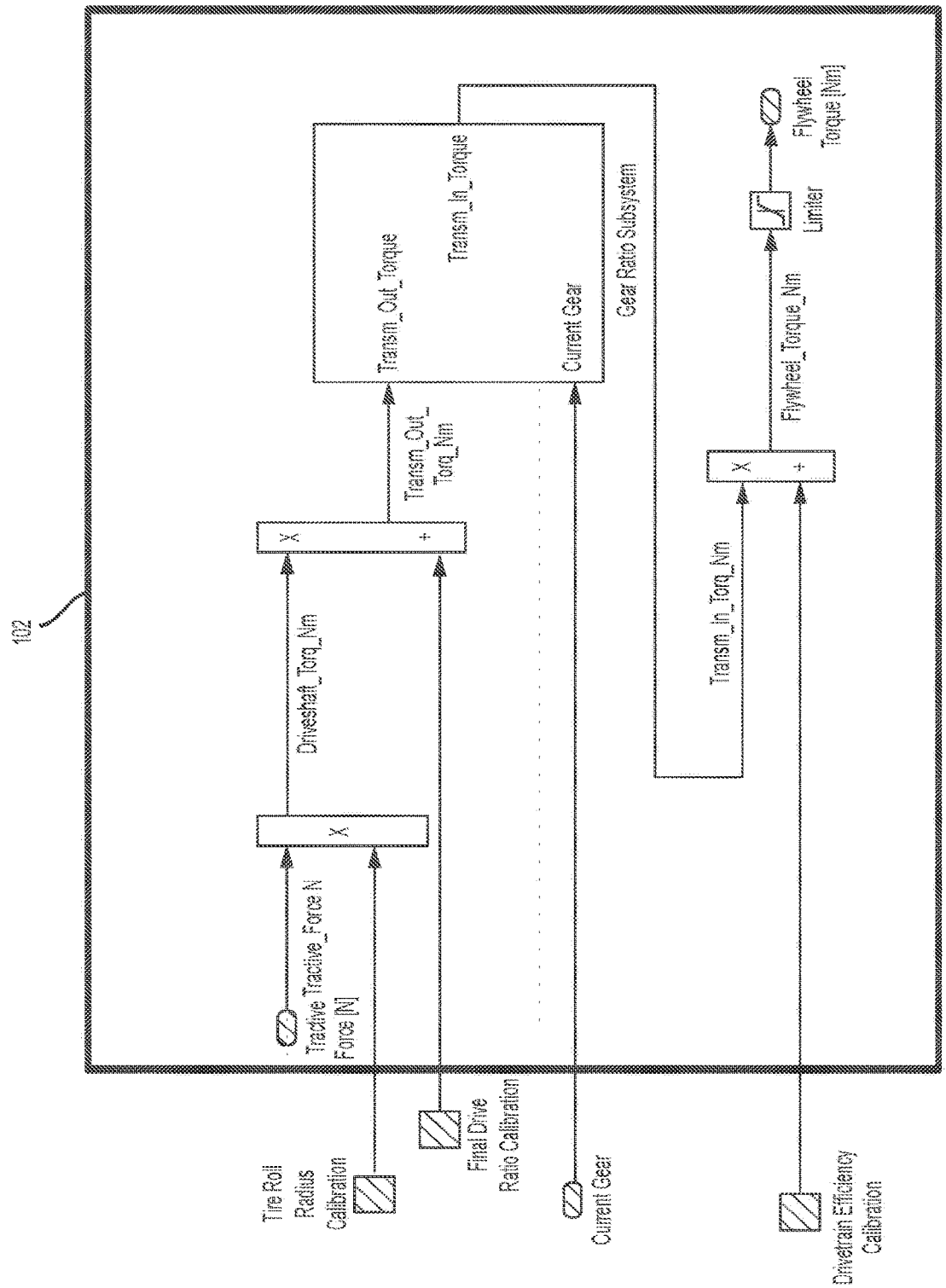

FIG. 3C illustrates the torque controller 102 determining the passive pedal torque value. In some embodiments, the torque controller 102 may determine the passive pedal torque value using powertrain data. The powertrain data may include a driveshaft torque value, a transmission out torque value, a transmission in torque value, and a flywheel torque value. Powertrain data may be determined based on configured data and/or received input data.

In some embodiments, the torque controller 102 may determine the driveshaft torque value based on the tractive force and a tire roll radius value. For example, the torque controller 102 may be configured with a tire roll radius value indicating a radius of the tire and may (e.g., using a multiplication module) multiply the tire roll radius value against the tractive force to determine the driveshaft torque value.

In some embodiments, the torque controller 102 may determine the transmission out torque value based on the driveshaft torque value and a final drive ratio calibration value. For example, the torque controller 102 may be configured with a final drive ratio calibration value indicating a differential gear ratio for the vehicle 10 and may (e.g., using a division module) multiply the final drive ratio calibration value against the driveshaft torque value to determine the transmission out torque value.

In some embodiments, the torque controller 102 may determine the transmission in torque value based on the transmission out torque value and gear data indicating a current gear of a transmission of the vehicle 10. For example, the torque controller 102 (e.g., using a gear ratio subsystem) may compare the transmission out torque value and the current gear value and may determine the transmission in torque value based on the comparison.

In some embodiments, the torque controller 102 may determine a flywheel torque value based on the transmission in torque value and a drivetrain efficiency calibration value. For example, the torque controller 102 may compute or may be configured with a drivetrain efficiency calibration value. This may allow the torque controller 102 (e.g., using a division module) to divide the transmission in torque by the drivetrain efficiency calibration value in order to determine the flywheel torque value (referred to elsewhere herein as the final torque). In some embodiments, the flywheel torque may be provided to the torque split controller 110 or to another component of the system 100.

In some embodiments, the personal computing device may generate graphical representations plotting simulations of the torque controller 102 selectively assigning control of the vehicle 10. For example, the computing device may perform a first simulation to monitor the vehicle 10, where the vehicle 10 begins from a rest position, has a target speed of 100 kilometers per hour (km/h), and traverses a route over an interval. While the vehicle 10 is traveling along the route to a destination, one or more vehicle sensors may capture a force that the driver applies to the pedal. The computing device may generate a first graph that illustrates a vehicle speed curve showing that the vehicle 10 linearly increases vehicle speed until reaching the target speed of 100 km/h. The computing device may generate a second graph that illustrates a driver requested torque value and a passive pedal torque value. Specifically, the second graph may illustrate that the driver requested torque value is always greater than the passive pedal torque value. Consequently, the passive pedal torque value is always selected as the final torque value provided to the torque split controller 110. The computing device may generate a third graph that illustrates a final torque curve that flat lines when the final torque value aligns with the target route for the vehicle 10. The computing device may generate a fourth graph that illustrates that the driver maintained a particular pedal position (e.g., pedal pressed down 80% of the total way down) throughout the duration of the interval or while traveling along the route.

In some embodiments, the computing device may perform a second simulation to monitor the vehicle 10, where the vehicle 10 begins from a rest position, has a target speed of 100 kilometers per hour, and traverses a route over an interval. While the vehicle 10 is traveling along the route to a destination, one or more vehicle sensors capture an applied force of the driver to the pedal. The computing device may generate a first graph that illustrates a vehicle speed curve showing that the vehicle 10 increases vehicle speed until reaching the target speed of 100 km/h and slightly over adjusting (e.g., such that the vehicle 10 is traveling at less than 100 km/h). The computing device may generate a second graph that illustrates a driver requested torque value and a passive pedal torque value. Specifically, a final torque value switches from the driver requested torque value to the passive pedal torque value at ~125s. The computing device may generate a third graph that illustrates a final torque curve that flat lines when the final torque value aligns with the target route for the vehicle 10. The computing device may generate a fourth graph that illustrates that the driver changed the pedal position at a linear rate starting with pressing the pedal down 10% of the way down and ending with pressing the pedal down 70% of the way down.

In some embodiments, the computing device may perform a third simulation to monitor the vehicle 10, where the vehicle 10 begins from a rest position, has a target speed of 100 kilometers per hour, and traverses a route over an interval. While the vehicle 10 is traveling along the route to a destination, one or more vehicle sensors record applied force of the driver to the pedal. The computing device may generate a first graph that illustrates a vehicle speed curve showing that the vehicle 10 increases vehicle speed until reaching the target speed of 100 km/h, at which point control of the vehicle 10 is switched from the driver to the sub-system of the vehicle 10. After a certain time period, the driver generates a driver requested torque value that is less than a passive pedal torque value, reducing the vehicle speed to a speed that is below the target speed of 100 km/h. This causes control of the vehicle 10 to be switched back to the driver until the vehicle speed again reaches 100 km/h, where control of the vehicle 10 is switched to the sub-system of the vehicle 10.

The computing device may generate a second graph that illustrates a relationship between a driver requested torque value and the passive pedal torque value in the scenario discussed in above in connection with the first graph. The computing device may generate a third graph that illustrates a final torque value as control shifts back and forth between the driver and the sub-system of the vehicle 10. The computing device may generate a fourth graph that illustrates a force applied to a driver pedal while the vehicle 10 is traveling to the destination.

In some embodiments, the computing device may perform a fourth simulation to monitor the vehicle 10, where the vehicle 10 begins from a rest position, has a target speed of 100 kilometers per hour, and traverses a route over an interval. While the vehicle 10 is traveling along the route to a destination, one or more vehicle sensors record applied force of the driver to the pedal. The computing device may generate a first graph that illustrates a vehicle speed curve showing that the vehicle 10 increases vehicle speed until reaching the target speed of 100 km/h, at which point an override mode is triggered that allows the driver to maintain control of the vehicle 10 (e.g., even though the vehicle speed is greater than the target vehicle speed).

The computing device may generate a second graph that illustrates a relationship between the driver requested torque value and the passive pedal torque value in the scenario discussed in above in connection with the first graph. The computing device may generate a third graph that illustrates a final torque value as control shifts back and forth between the driver and the sub-system of the vehicle 10 (e.g., including when the override mode is triggered). The computing device may generate a fourth graph that illustrates a force applied to a driver pedal while the vehicle 10 is traveling to the destination.

In this way, the torque controller 102 selectively assigns control of the vehicle 10 based on a number of different factors.

In some embodiments, a controller (e.g., the torque controller 102) and/or a vehicle system (e.g., the system 100) may be configured to perform the method 400. However, the method 400, as performed by the controller and/or the system, are not meant to be limiting, and any type of software executed on a controller can perform the method 400 without departing from the scope of this disclosure. For example, another controller that is part of the vehicle system (e.g., different from the torque controller 102), such as a processor executing software within a computing device, can perform the methods described herein.

Figure 4:
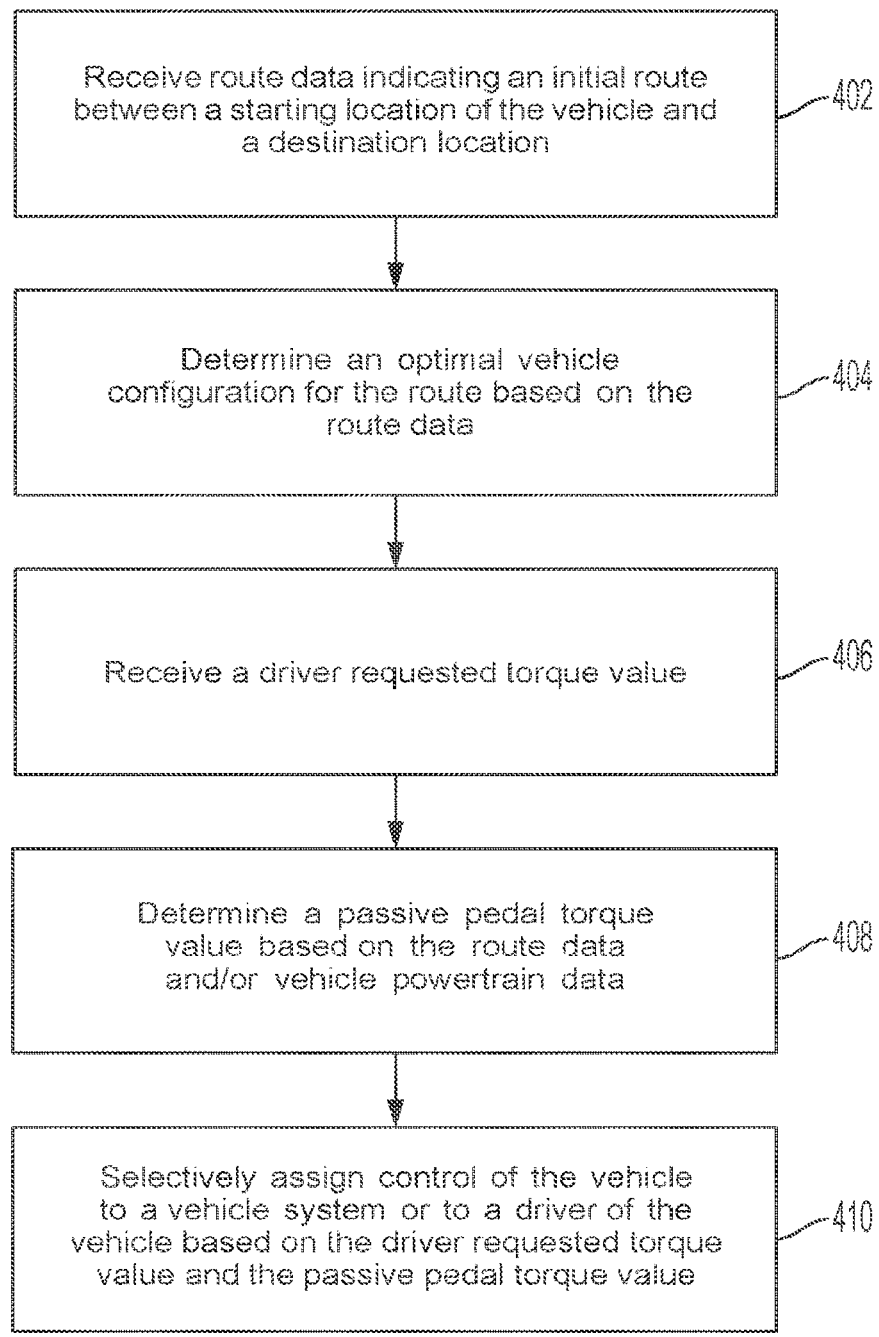
FIG. 4 is a flow diagram generally illustrating a vehicle control assignment method according to the principles of the present disclosure.

FIG. 4 is a flow diagram generally illustrating a vehicle control assignment method 400 according to the principles of the present disclosure. At 402, the method 400 receives route data indicating a route between a starting location and a destination location of a vehicle. For example, the torque controller 102 may receive route data indicating a route between a starting location and a destination location of a vehicle.

At 404, the method 400 determines an optimal vehicle configuration for the route based on the route data. For example, the controller may determine an optimal vehicle configuration for the route based on the route data. In some embodiments, the controller may determine the optimal vehicle configuration based on at least one of the route data or sensor data from one or more vehicle sensors. The sensor data may include any of the data types described herein, such as vehicle data, weather data, grade data, and/or the like.

At 406, the method 400 receives a driver requested torque value. For example, the controller may receive a driver requested torque value based on the driver applying a force to a pedal of the vehicle. In this case, a sensor may measure a pedal position and may provide the pedal position to an intelligent driving module to allow the intelligent driving module (or another component of the system 100) to map a pedal position value to a driver requested torque value. The intelligent driving module may provide the driver requested torque module to the controller.

At 408, the method 400 determines a passive pedal torque value based on the route data and/or vehicle powertrain data. For example, the controller may determine a passive pedal torque value based on the route data and/or vehicle powertrain data that includes at least one of a driveshaft torque value, a transmission output torque value, a transmission input torque value, or a flywheel torque value. In some embodiments, the vehicle powertrain data may include each of the driveshaft torque value, the transmission output torque value, the transmission input torque value, and the flywheel torque value.

In some embodiments, the controller may determine the driveshaft torque value based on a tractive force of the vehicle and a tire roll radius calibration value. In some embodiments, the tractive force may be determined based on at least one of a first force associated with operating the vehicle while maintaining the target vehicle speed, a second force representing an acceleration to adjust vehicle speed from a current vehicle speed to the target vehicle speed, or a third closed-loop force accounting for one or more real-time conditions. In some embodiments, the first force may be determined based on a fourth force representing resistance at steady state on a flat road and a fifth force representing a torque that causes the vehicle to ascend or descend a road, wherein the second force is determined based on a calibrated acceleration rate and a mass of the vehicle, and wherein the third force is determined based on an integral term representing a difference between the current vehicle speed and the target vehicle speed.

In some embodiments, the controller may determine the transmission output torque value based on the driveshaft torque value and a final drive ratio calibration value. In some embodiments, the controller may determine the transmission input torque value based on the transmission output torque value and a value indicating a current gear of the vehicle. In some embodiments, the controller may determine the flywheel torque value based on the transmission input torque value and a drivetrain efficiency calibration value.

At 410, the method 400 selectively assigns control of the vehicle to a vehicle system or to a driver of the vehicle based on the driver requested torque value and the passive pedal torque. For example, the controller may selectively assign control of the vehicle to the vehicle system or to the driver of the vehicle in response to the passive pedal torque value being greater than the driver requested torque value. The vehicle system that can be assigned control may include system 100, a sub-system within vehicle 10, a specific component of the system 100 or the sub-system, or the like. For example, the vehicle system may include an autonomous of partially autonomous driving sub-system that, when assigned control, is to apply an appropriate amount of torque needed to control the vehicle.

In some embodiments, the controller, when selectively assigning control of the vehicle, may compare the driver requested torque value and the passive pedal torque value. This may allow the driver to selectively assign control of the vehicle to the vehicle system or to the driver based on comparing the driver requested torque value and the passive pedal torque value. Control may be assigned to the vehicle system based on the passive pedal torque value being greater than the driver requested torque value or may be assigned to the driver based on the passive pedal torque value being less than the driver requested torque value.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A method for assignment of vehicle control, the determining, by one or more processors, an optimal vehicle configuration based on route data indicating a route between a starting location and a destination location;
   receiving a driver requested torque value;
   determining a passive pedal torque value based on the route data and vehicle powertrain data, wherein the vehicle powertrain data includes at least one of a driveshaft torque value, a transmission output torque value, a transmission input torque value, and a flywheel torque value; and
   selectively assigning control of the vehicle to a vehicle system or to a driver of the vehicle based on the driver requested torque value and the passive pedal torque value.

2. The method of claim 1, further comprising determining the driveshaft torque value based on a tractive force of the vehicle and a tire roll radius calibration value.

3. The method of claim 2, wherein the tractive force is determined based on at least one of a first force associated with operating the vehicle while maintaining a target vehicle speed, a second force representing an acceleration to adjust vehicle speed from a current vehicle speed to the target vehicle speed, and a third closed-loop force accounting for one or more real-time conditions.

4. The method of claim 3, wherein the first force is determined based on a fourth force representing vehicle tire resistance at steady state on a flat road and a fifth force representing a torque that causes the vehicle to ascend or descend a road, wherein the second force is determined based on a calibrated acceleration rate and a mass of the vehicle, and wherein the third closed-loop force is determined based on an integral term representing a difference between the current vehicle speed and the target vehicle speed.

5. The method of claim 1, further comprising:
   determining the transmission output torque value based on the driveshaft torque value and a final drive ratio calibration value;
   determining the transmission input torque value based on the transmission output torque value and a value indicating a current gear of the vehicle; and
   determining the flywheel torque value based on the transmission input torque value and a drivetrain efficiency calibration value.

6. The method of claim 1, wherein selectively assigning control of the vehicle includes:
   comparing the driver requested torque value and the passive pedal torque value;
   selectively assigning control of the vehicle to the vehicle system in response to the passive pedal torque value being greater than the driver requested torque value; and
   selectively assigning control of the vehicle to the driver in response to the passive pedal torque value being less than the driver requested torque value.

7. The method of claim 1, wherein selectively assigning control of the vehicle includes:
   comparing the driver requested torque value and a torque override value; and
   selectively assigning control of the vehicle to the driver of the vehicle in response to the driver requested torque value being greater than or equal to the torque override value, wherein the torque override value is greater than the passive pedal torque value.

8. An apparatus for assignment of vehicle control, comprising:
   one or more processors; and
   a memory that includes instructions that, when executed by the one or more processors, cause the one or more processors to:
      determine an optimal vehicle configuration based on route data indicating a route between a starting location and a destination location;
      receive a driver requested torque value;

determine a passive pedal torque value based on vehicle powertrain data, wherein the vehicle powertrain data includes at least one of a driveshaft torque value, a transmission output torque value, a transmission input torque value, and a flywheel torque value; and selectively assign control of the vehicle to a vehicle system or to a driver of the vehicle based on the driver requested torque value and the passive pedal torque value.

9. The apparatus of claim 8, wherein the instructions further cause the one or more processors to determine the driveshaft torque value based on a tractive force of the vehicle and a tire roll radius calibration value.

10. The apparatus of claim 9, wherein the tractive force is determined based on a first force associated with operating the vehicle while maintaining a target vehicle speed, a second force representing an acceleration to adjust vehicle speed from a current vehicle speed to the target vehicle speed, and a third closed-loop force accounting for one or more real-time conditions.

11. The apparatus of claim 8, wherein the instructions cause the one or more processors to:
determine the transmission output torque value based on the driveshaft torque value and a final drive ratio calibration value; and
determine the transmission input torque value based on the transmission output torque value and a value indicating a current gear of the vehicle.

12. The apparatus of claim 8, wherein the instructions further cause the one or more processors to determine the flywheel torque value based on the transmission input torque value and a drivetrain efficiency calibration value.

13. The apparatus of claim 8, wherein the instructions further cause the one or more processors to selectively assign control of the vehicle to the vehicle system or to the driver of the vehicle by:
comparing the driver requested torque value and the passive pedal torque value; and
selectively assigning control of the vehicle to the vehicle system or to the driver in response to the passive pedal torque value being greater than the driver requested torque value.

14. The apparatus of claim 8, wherein the instructions further cause the one or more processors to selectively assign control of the vehicle to the vehicle system or to a driver of the vehicle by:
comparing the driver requested torque value and a torque override value; and
selectively assigning control of the vehicle to the driver of the vehicle in response to the driver requested torque value being greater than or equal to the torque override value, wherein the torque override value is greater than the passive pedal torque value.

15. A non-transitory computer-readable storage medium, comprising instructions that, when executed by one or more processors, cause the one or more processors to:
determine an optimal vehicle configuration based on route data indicating a route between a starting location of a vehicle and a destination location;
receive a driver requested torque value;
determine a passive pedal torque value based on the route data and vehicle powertrain data, wherein the vehicle powertrain data includes at least one of a driveshaft torque value, a transmission output torque value, a transmission input torque value, and a flywheel torque value; and
selectively assign control of the vehicle to a vehicle system or to a driver of the vehicle based on the driver requested torque value and the passive pedal torque value.

16. The non-transitory computer-readable storage medium of claim 15, wherein the instructions further cause the one or more processors to determine the driveshaft torque value based on a tractive force of the vehicle and a tire roll radius calibration value.

17. The non-transitory computer-readable storage medium of claim 15, wherein the instructions further cause the one or more processors to:
determine the transmission output torque value based on the driveshaft torque value and a final drive ratio calibration value; and
determine the transmission input torque value based on the transmission output torque value and a value indicating a current gear of the vehicle.

* * * * *